United States Patent
Mihai et al.

(10) Patent No.: US 10,832,363 B2
(45) Date of Patent: Nov. 10, 2020

(54) METHODS AND SYSTEMS FOR REPRESENTING USAGE OF AN ELECTRONIC LEARNING SYSTEM

(71) Applicant: D2L Corporation, Kitchener (CA)

(72) Inventors: Sebastian Mihai, Kitchener (CA); Dariusz Grabka, Kitchener (CA)

(73) Assignee: D2L CORPORATION, Kitchener (CA)

( * ) Notice: Subject to any disclaimer, the term of this patent is extended or adjusted under 35 U.S.C. 154(b) by 0 days.

(21) Appl. No.: 16/425,048

(22) Filed: May 29, 2019

(65) Prior Publication Data

US 2019/0347749 A1  Nov. 14, 2019

Related U.S. Application Data

(63) Continuation of application No. 14/267,023, filed on May 1, 2014, now Pat. No. 10,339,616.

(51) Int. Cl.
*G06Q 50/20* (2012.01)
*G09B 5/00* (2006.01)
*G09B 7/02* (2006.01)

(52) U.S. Cl.
CPC ........... *G06Q 50/20* (2013.01); *G06Q 50/205* (2013.01); *G09B 5/00* (2013.01); *G09B 7/02* (2013.01)

(58) Field of Classification Search
CPC . G09B 7/02; G09B 5/00; G06Q 50/20; G06Q 50/205
See application file for complete search history.

(56) References Cited

U.S. PATENT DOCUMENTS

| | | |
|---|---|---|
| 2004/0150662 A1 | 8/2004 | Beigel |
| 2004/0157201 A1 | 8/2004 | Hollingsworth et al. |
| 2007/0156718 A1 | 7/2007 | Hossfeld et al. |
| 2008/0091686 A1 | 4/2008 | Beard |
| 2008/0177504 A1 | 7/2008 | Niblock |
| 2008/0268418 A1 | 10/2008 | Tashner |
| 2009/0035733 A1 | 2/2009 | Meitar et al. |
| 2009/0191527 A1 | 7/2009 | King et al. |
| 2009/0197234 A1 | 8/2009 | Creamer et al. |
| 2009/0327053 A1 | 12/2009 | Niblock |
| 2010/0003659 A1 | 1/2010 | Edmonds |
| 2011/0306029 A1 | 12/2011 | Prince |
| 2012/0244510 A1 | 9/2012 | Watkins, Jr. |
| 2012/0265770 A1 | 10/2012 | Desjardins et al. |
| 2012/0288846 A1 | 11/2012 | Hull |
| 2014/0057238 A1 | 2/2014 | Okamoto et al. |
| 2014/0274243 A1 | 9/2014 | Lopez et al. |
| 2015/0125843 A1 | 5/2015 | Mayumi et al. |
| 2015/0302755 A1 | 10/2015 | Breck et al. |

*Primary Examiner* — Nathan Hillery
(74) *Attorney, Agent, or Firm* — Bereskin & Parr LLP/S.E.N.C.R.L., s.r.l.

(57) ABSTRACT

A method and system for representing usage of an electronic learning system. The method and system involve receiving an input indicative of a selection of a property of the electronic learning system to be represented, the property including a course content provided by the electronic learning system and an activity available for that course content; receiving representation parameters that define a scope of the usage to be represented; determining an event count for the property during the period of interest; and generating a usage indicator for the property based at least on the event count. The usage indicator is generally reflective of at least a usage amount of the property during the period of interest.

19 Claims, 10 Drawing Sheets

| Math 101 Self-Assessment | Week 1 Nov 11-Nov 17 | Week 2 Nov 18-Nov 24 | Week 3 Nov 25-Dec 1 | Week 4 Dec 2-Dec 8 | Week 5 Dec 9-Dec 15 |
|---|---|---|---|---|---|
| Number of Completions | 0 | 3 | 15 | 20 | 30 |
| Time Spent > 1 Hour | 0 | 1 | 5 | 8 | 5 |

FIG. 5A

| Math 101 Self-Assessment | Week 1 Nov 11-Nov 17 | Week 2 Nov 18-Nov 24 | Week 3 Nov 25-Dec 1 | Week 4 Dec 2-Dec 8 | Week 5 Dec 9-Dec 15 |
|---|---|---|---|---|---|
| Number of Completions | 0 | 0.1 | 0.5 | 0.67 | 1.0 |
| Time Spent > 1 Hour | 0 | 0.13 | 0.63 | 1.0 | 0.63 |

FIG. 5B

| Math 101 Self-Assessment | Week 1 Nov 11-Nov 17 | Week 2 Nov 18-Nov 24 | Week 3 Nov 25-Dec 1 | Week 4 Dec 2-Dec 8 | Week 5 Dec 9-Dec 15 |
|---|---|---|---|---|---|
| Usage Indicator | 0*0.8+0*0.2 =0.0 | 0.1*0.8+0.13*0.2 =0.106 | 0.5*0.8+0.63*0.2 =0.526 | 0.67*0.8+1.0*0.2 =0.736 | 1.0*0.8+0.63*0.2 =0.926 |

FIG. 5C

| 326 → | Math 101<br>Self-Assessment | Week 1<br>Nov 11–Nov 17 | Week 2<br>Nov 18–Nov 24 | Week 3<br>Nov 25–Dec 1 | Week 4<br>Dec 2–Dec 8 | Week 5<br>Dec 9–Dec 15 |
|---|---|---|---|---|---|---|
| 330a → | Number of Completions | 0<br>410a | 3<br>410b | 15<br>410c | 20<br>410d | 30<br>410e |

500A

| 328 → | Calculus II<br>Self-Assessment | Week 1<br>Nov 11–Nov 17 | Week 2<br>Nov 18–Nov 24 | Week 3<br>Nov 25–Dec 1 | Week 4<br>Dec 2–Dec 8 | Week 5<br>Dec 9–Dec 15 |
|---|---|---|---|---|---|---|
| 330a → | Number of Completions | 0<br>510a | 0<br>510b | 2<br>510c | 10<br>510d | 15<br>510e |

| 326 → Math 101 Self-Assessment | Week 1 Nov 11–Nov 17 | Week 2 Nov 18–Nov 24 | Week 3 Nov 25–Dec 1 | Week 4 Dec 2–Dec 8 | Week 5 Dec 9–Dec 15 |
|---|---|---|---|---|---|
| 330a → Number of Completions | 0 | 0.1 | 0.5 | 0.67 | 1.0 |
|  | 410a' | 410b' | 410c' | 410d' | 410e' |

↙ 500B

| 328 → Calculus II Self-Assessment | Week 1 Nov 11–Nov 17 | Week 2 Nov 18–Nov 24 | Week 3 Nov 25–Dec 1 | Week 4 Dec 2–Dec 8 | Week 5 Dec 9–Dec 15 |
|---|---|---|---|---|---|
| 330a → Number of Completions | 0 | 0 | 0.07 | 0.3 | 0.5 |
|  | 510a' | 510b' | 510c' | 510d' | 510e' |

METHODS AND SYSTEMS FOR REPRESENTING USAGE OF AN ELECTRONIC LEARNING SYSTEM

TECHNICAL FIELD

The described embodiments relate to methods and systems associated with representing usage of an electronic learning system, and in particular, to representing usage of interaction with a course content provided by an electronic learning system.

INTRODUCTION

Electronic learning (also known as "e-Learning" or "eLearning") generally refers to education or learning where users engage in education related activities using computers and other computing devices. For example, users may enroll or participate in a course or program of study offered by an educational institution (e.g., a college, university or grade school) through a web interface that is accessible over the Internet. Users may receive assignments electronically, participate in group work and projects by collaborating over the Internet, and be graded based on assignments and examinations that are submitted, for example, using an electronic submission tool.

Electronic learning is not limited to use by educational institutions. Electronic learning may be used in other environments, such as government and corporations. For example, employees at a regional branch office of a corporation may use electronic learning to participate in a training course offered by another office, or even a third-party provider. As a result, the employees at the regional branch office can participate in the training course without having to travel to the site providing the training course. Travel time and costs can be reduced and conserved.

In addition to offering convenient access to electronic learning, electronic learning systems can collect and manage data associated with the usage of the systems. In traditional learning environments, instructors are typically unable to properly assess the value of certain course content. Although course assessments can provide the instructors with an estimate of the value of the course contents, the instructors cannot readily determine how or whether the course contents were used. Therefore, the instructors are usually unable to correlate a student's result in the course with the provided course contents.

SUMMARY OF SOME EMBODIMENTS

The various embodiments described herein generally relate to methods (and associated systems configured to implement the methods) for representing usage of an electronic learning system.

In accordance with one embodiment, there is provided a method for representing usage of an electronic learning system. The method includes receiving an input indicative of a selection of an interaction with a course content provided by the electronic learning system; receiving representation parameters that define a scope of the usage to be represented, the representation parameters including at least a period of interest; determining an event count for the interaction during the period of interest, the event count being a number of events stored at one or more storage components of the electronic learning system for the interaction with the course content; and generating a usage indicator that is reflective of a usage amount of the course content during the period of interest, the usage indicator being generated by adjusting the event count with at least one of a count parameter and a weight factor, the count parameter providing at least one limitation to a value of the event count and the weight factor indicating an amount of influence that the interaction has on the usage of the electronic learning system.

In some embodiments, the representation parameters further comprise a time interval that is shorter than the period of interest; and determining the event count for the interaction during the period of interest includes separating the period of interest into a set of sub-periods according to the time interval, a length of at least one sub-period corresponds to the time interval; and determining a plurality of counts for the period of interest, each count being the number of events corresponding to the interaction with the course content during a sub-period and the event count being a sum of the plurality of counts.

In some embodiments, the count parameter includes at least one of an upper count limit and a lower count limit; and adjusting the event count with the count parameter includes, when the count parameter is the upper count limit: determining whether the event count exceeds the upper count limit; and in response to determining the event count exceeds the upper count limit, reducing the event count to the upper count limit; and, when the count parameter is the lower count limit: generating an intermediary event count by subtracting the lower count limit from the event count; and if the intermediary event count is less than zero, setting the event count to zero, otherwise using the intermediary event count as the event count.

In accordance with another embodiment, there is provided a method for representing usage of an electronic learning system. The method comprising: receiving an input indicative of a selection of a property of the electronic learning system to be represented, the property including a course content provided by the electronic learning system and an activity available for that course content; receiving representation parameters that define a scope of the usage to be represented, the representation parameters including at least a period of interest; determining an event count for the property during the period of interest, the event count corresponding to a number of events stored at one or more storage components of the electronic learning system in association with the property for the period of interest; and generating a usage indicator for the property based at least on the event count, the usage indicator being reflective of at least a usage amount of the property during the period of interest.

In some embodiments, the representation parameters include a time interval, the time interval being shorter than the period of interest; and determining the event count for the property during the period of interest comprises: separating the period of interest into a set of sub-periods according to the time interval, a length of at least one sub-period corresponds to the time interval; and determining a plurality of counts for the period of interest, each count being the number of events corresponding to the property for a sub-period and the event count being a sum of the plurality of counts.

In some cases, generating the usage indicator for the property based at least on the event count comprises: determining a top count from the two or more counts, the top count being the count from the two or more counts with a greatest value; and normalizing each count with the top count.

In some cases, the method further includes receiving a transformation mode indicator for the event count, the transformation mode indicator providing a type of adjustment to be applied to the event count; and varying each count in accordance with the transformation mode indicator.

In some cases, the transformation mode indicator corresponds to a peak mode; and varying each count in accordance with the transformation mode indicator comprises: identifying the sub-period associated with the top count; and, for each sub-period subsequent to the identified sub-period, replacing the corresponding normalized count with the normalized top count.

In some cases, the transformation mode indicator corresponds to a cumulative average mode; and varying each count in accordance with the transformation mode indicator comprises, for each sub-period, retrieving the count associated with each prior sub-period; and generating an adjusted count by determining an average of the count for each prior sub-period and the count for that sub-period; and replacing the count for that sub-period with the adjusted count.

In some cases, determining the event count for the property during the period of interest further comprises: setting the event count to zero; retrieving, from the one or more storage components, events that satisfy the representation parameters; and for each retrieved event, determining whether that event is associated with the property and if so, incrementing the event count.

In some cases, generating the usage indicator for the property based at least on the event count comprises: receiving a weight factor for the activity, the weight factor indicating an amount of influence the activity has on the usage of the electronic learning system; and adjusting the event count with the weight factor.

In some cases, determining the event count for the property during the period of interest further comprises: receiving a count parameter for the event count, the count parameter providing at least one limitation to a value of the event count; and adjusting the event count based on the count parameter.

In some cases, the count parameter comprises an upper count limit; adjusting the event count based on the count parameter comprises: determining whether the event count exceeds the upper count limit; and in response to determining the event count exceeds the upper count limit, reducing the event count to the upper count limit.

In some cases, the count parameter comprises a lower count limit; adjusting the event count based on the count parameter comprises: generating an intermediary event count by subtracting the lower count limit from the event count; and if the intermediary event count is less than zero, setting the event count to zero, otherwise using the intermediary event count as the event count.

In some cases, the activity is associated with a first course content and a second course content that is different from the first course content; the usage indicator comprises a first usage indicator for the activity at the first course content and a second usage indicator for the activity at the second course content; determining the event count for the property during the period of interest comprises: generating a first event count for the first course content, the first event count corresponding to the usage amount of the activity at the first course content during the period of interest; and generating a second event count for the second course content, the second event count corresponding to the usage amount of the activity at the second course content during the period of interest; and generating each of the first usage indicator and the second usage indicator based at least on the first event count and the second event count.

In some cases, the method may further include determining whether the first event count is greater than the second event count; and if the first event count is greater than the second event count, normalizing each of the first event count and the second event count with the first event count, otherwise normalizing each of the first event count and the second event count with the second event count.

In some cases, generating the usage indicator for the property comprises providing a visual representation of the usage indicator. The visual representation may include a heat map. The visual representation may include an adjustable display operable to receive one or more control inputs for selecting a designated time within the period of interest; and vary the visual presentation to illustrate the usage indicator at the designated time.

In some cases, the property further comprises a group composed of one or more users of the electronic learning system.

In some cases, the activity comprises at least an interaction by a user with the electronic learning system.

In some cases, the course content comprises any one or more components that provides course material, a discussion forum, a chat, an assessment, a rubric, an assignment, a message board, a checklist, and a submission tool.

In accordance with another embodiment, there is provided a system for representing usage of an electronic learning system. The system comprising: a processing component configured to operate one or more components of the electronic learning system to represent usage of the electronic learning system; one or more storage components for storing, at least, events associated with the electronic learning system, the one or more storage components being in communication with the processing component; and a representation component operated by the processing component to: receive an input indicative of a selection of a user interaction type with a course content provided by the electronic learning system; receive representation parameters that define a scope of the usage to be represented, the representation parameters including at least a period of interest; determine an event count for the user interaction type during the period of interest, the event count being a number of events stored at the one or more storage components of the electronic learning system for the user interaction type with the course content; and generate a usage indicator that is reflective of a usage amount of the course content during the period of interest, the usage indicator being generated by adjusting the event count with at least one of a count parameter and a weight factor, the count parameter providing at least one limitation to a value of the event count and the weight factor indicating an amount of influence that the user interaction type has on the usage of the electronic learning system.

In some cases, the representation parameters further comprise a time interval that is shorter than the period of interest; and the representation component is further operated by the processing component to: separate the period of interest into a set of sub-periods according to the time interval, a length of at least one sub-period corresponds to the time interval; and determine a plurality of counts for the period of interest, each count being the number of events corresponding to the user interaction type with the course content during a sub-period and the event count being a sum of the plurality of counts.

In some cases, the count parameter comprises at least one of an upper count limit and a lower count limit; and the representation component is further operated by the processing component to: when the count parameter is the upper count limit: determine whether the event count exceeds the upper count limit; and in response to determining the event count exceeds the upper count limit, reduce the event count to the upper count limit; and when the count parameter is the lower count limit: generate an intermediary event count by subtracting the lower count limit from the event count; and if the intermediary event count is less than zero, set the event count to zero, otherwise using the intermediary event count as the event count.

In accordance with another embodiment, there is provided a system for representing usage of an electronic learning system. The system comprising: a processing component configured to operate one or more components of the electronic learning system to represent usage of the electronic learning system; one or more storage components for storing, at least, events associated with the electronic learning system, the one or more storage components being in communication with the processing component; and a representation component operated by the processing component to: receive an input indicative of a selection of a property of the electronic learning system to be represented, the property including a course content provided by the electronic learning system and an activity available for that course content; receive representation parameters that define a scope of the usage to be represented, the representation parameters including at least a period of interest; determine an event count for the property during the period of interest, the event count corresponding to a number of events stored at the one or more storage components of the electronic learning system in association with the property for the period of interest; and generate a usage indicator for the property based at least on the event count, the usage indicator being reflective of at least a usage amount of the property during the period of interest.

DETAILED DESCRIPTION OF THE DRAWINGS

Several embodiments will now be described in detail with reference to the drawings, in which:

FIG. 5A is a table showing event counts for a property of the electronic learning system in accordance with an example embodiment;

FIG. 5B is a table showing adjusted event counts generated based on the event counts in FIG. 5A in accordance with an example embodiment;

FIG. 5C is a table showing usage indicator values generated based on the adjusted event counts in FIG. 5B in accordance with an example embodiment;

FIG. 6A illustrates two tables showing event counts for two course contents provided by the electronic learning system in accordance with an example embodiment;

FIG. 6B illustrates two tables showing adjusted event counts generated based on the event counts in FIG. 6A in accordance with an example embodiment.

Figure 1:
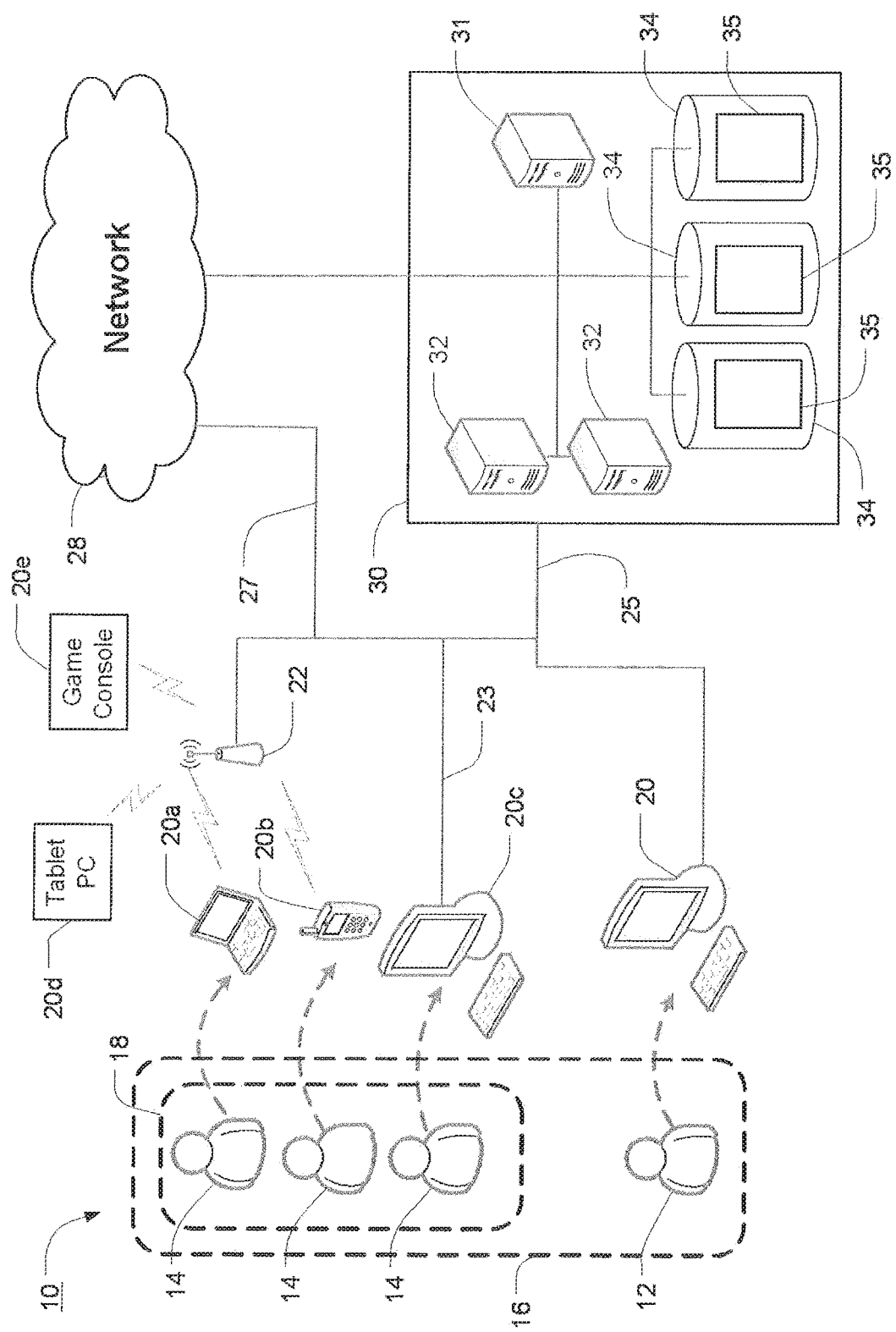
FIG. 1 is a schematic diagram of components interacting with an electronic learning system in accordance with some embodiments.

The drawings, described below, are provided for purposes of illustration, and not of limitation, of the aspects and features of various examples of embodiments described herein.

DESCRIPTION OF SOME EMBODIMENTS

For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. In some cases, embodiments may be implemented in one or more computer programs executing on one or more programmable computing devices comprising at least one processor, a data storage component (including volatile memory or non-volatile memory or other data storage elements or a combination thereof) and at least one communication interface.

For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

In some embodiments, each program may be implemented in a high level procedural or object-oriented programming and/or scripting language to communicate with a computer system. However, the programs can be implemented in assembly or machine language, if desired. In any case, the language may be a compiled or interpreted language.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

The various embodiments described herein generally relate to methods (and associated systems configured to implement the methods) for representing usage of an electronic learning system. As noted, the electronic learning system can collect and manage data associated with its usage. In traditional learning environments, such as a classroom setting, instructors cannot readily determine how, or even whether, the course materials are used by the students. As a result, instructors typically rely on voluntary surveys issued to the students at the end of the course to receive feedback concerning the course content or course assessments to estimate the value of the course contents.

These sources of information in traditional learning environments are rather limited. The survey and course assessments are typically completed near the end of the course and therefore instructors cannot adjust the course materials during the pendency of the course, if needed. Also, the data from the surveys can be overly subjective and may also be incomplete since not all students may submit responses to a survey. Although a student's results from course assessments may generally be indicative of that student's understanding of the course materials, the results cannot be properly correlated with the quality of the course content since it is difficult, in a traditional learning environment, to determine how, or whether, that student used the course materials.

Electronic learning systems, on the other hand, can collect and track data associated with its usage. The methods and systems described herein are directed to representing that usage. An example method includes receiving an input that is indicative of a selection of a property of the electronic learning system and representation parameters that define a scope of the usage to be represented. The property can include a course content that is provided by the electronic learning system and an activity (e.g., some form of interaction with the electronic learning system) available for that course content. The representation parameters can include a period of interest, for example.

Based on the property and the representation parameters, the electronic learning system can generate a usage indicator for that property using data available for that property during that period of interest. For example, the usage indicator can be generated based on an event count stored at the storage components of the electronic learning system for that property. The usage indicator can generally be reflective of a usage amount of that property during the period of interest.

The electronic learning system can then generate visualizations, or graphical representations, to illustrate the usage indicator so that the relevant user, such as the instructor of that course, can easily understand how that property is used and the value of that property in facilitating the students' learning.

Referring now to FIG. 1, illustrated therein is a schematic diagram 10 of components interacting with an electronic learning system 30 for providing electronic learning according to some embodiments.

As shown in the schematic diagram 10, one or more users 12, 14 may access the electronic learning system 30 to participate in, create, and consume electronic learning services, including educational content such as courses. In some cases, the electronic learning system 30 may be part of (or associated with) a traditional "bricks and mortar" educational institution (e.g. a grade school, university or college), another entity that provides educational services (e.g. an online university, a company that specializes in offering training courses, an organization that has a training department, etc.), or may be an independent service provider (e.g. for providing individual electronic learning).

It should be understood that a course is not limited to formal courses offered by formal educational institutions. The course may include any form of learning instruction offered by an entity of any type. For example, the course may be a training seminar at a company for a group of employees or a professional certification program (e.g. Project Management Professional™ (PMP), Certified Management Accountants (CMA), etc.) with a number of intended participants.

In some embodiments, one or more educational groups 16 can be defined to include one or more users 12, 14. For example, as shown in FIG. 1, the users 12, 14 may be grouped together in the educational group 16. The educational group 16 can be associated with a particular course (e.g. History 101 or French 254, etc.), for example. The educational group 16 can include different types of users. A first user 12 can be responsible for organizing and/or teaching the course (e.g. developing lectures, preparing assignments, creating educational content, etc.), such as an instructor or a course moderator. The other users 14 can be consumers of the course content, such as students.

In some examples, the users 12, 14 may be associated with more than one educational group 16 (e.g. some users 14 may be enrolled in more than one course, another example user 12 may be a student enrolled in one course and an instructor responsible for teaching another course, a further example user 12 may be responsible for teaching several courses, and so on).

In some examples, educational sub-groups 18 may also be formed. For example, the users 14 shown in FIG. 1 form an educational sub-group 18. The educational sub-group 18 may be formed in relation to a particular project or assignment (e.g. educational sub-group 18 may be a lab group) or based on other criteria. In some embodiments, due to the nature of electronic learning, the users 14 in a particular educational sub-group 18 may not need to meet in person, but may collaborate together using various tools provided by the electronic learning system 30.

In some embodiments, other educational groups 16 and educational sub-groups 18 could include users 14 that share common interests (e.g. interests in a particular sport), that participate in common activities (e.g. users that are members of a choir or a club), and/or have similar attributes (e.g. users that are male, users under twenty-one years of age, etc.).

Communication between the users 12, 14 and the electronic learning system 30 can occur either directly or indirectly using any one or more suitable computing devices. For example, the user 12 may use a computing device 20 having one or more device processors such as a desktop computer that has at least one input device (e.g. a keyboard and a mouse) and at least one output device (e.g. a display screen and speakers).

The computing device 20 can generally be any suitable device for facilitating communication between the users 12, 14 and the electronic learning system 30. For example, the computing device 20 could be wirelessly coupled to an access point 22 (e.g. a wireless router, a cellular communications tower, etc.), such as a laptop 20a, a wirelessly enabled personal data assistant (PDA) or smart phone 20b, a tablet computer 20d, or a game console 20e. The computing device 20 could be coupled to the access point 22 over a wired connection 23, such as a computer terminal 20c.

The computing devices 20 may communicate with the electronic learning system 30 via any suitable communication channels.

The computing devices 20 may be any networked device operable to connect to the network 28. A networked device is a device capable of communicating with other devices through a network such as the network 28. A network device may couple to the network 28 through a wired or wireless connection.

As noted, these computing devices may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. These computing devices may be handheld and/or wearable by the user.

In some embodiments, these computing devices may be a laptop 20a, or a smartphone device 20b equipped with a network adapter for connecting to the Internet. In some embodiments, the connection request initiated from the computing devices 20a, 20b may be initiated from a web browser and directed at the browser-based communications application on the electronic learning system 30.

For example, the computing devices 20 may communicate with the electronic learning system 30 via the network 28. The network 28 may include a local area network (LAN) (e.g., an intranet) and/or an external network (e.g., the Internet). For example, the computing devices 20 may access the network 28 by using a browser application provided on the computing device 20 to access one or more web pages presented over the Internet via a data connection 27.

The network 28 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WI-Fi, WiMAX), SS7 signaling network, fixed line, local area network, wide area network, and others, including any combination of these, capable of interfacing with, and enabling communication between the computing devices 20 and the electronic learning system 30, for example.

In some examples, the electronic learning system 30 may authenticate an identity of one or more of the users 12, 14 prior to granting the user 12, 14 access to the electronic learning system 30. For example, the electronic learning system 30 may require the users 12, 14 to provide identifying information (e.g., a login name and/or a password) in order to gain access to the electronic learning system 30.

In some examples, the electronic learning system 30 may allow certain users 12, 14, such as guest users, access to the electronic learning system 30 without requiring authentication information to be provided by those guest users. Such guest users may be provided with limited access, such as the ability to review one or more components of the course to decide whether they would like to participate in the course but without the ability to post comments or upload electronic files.

In some embodiments, the electronic learning system 30 may communicate with the access point 22 via a data connection 25 established over the LAN. Alternatively, the electronic learning system 30 may communicate with the access point 22 via the Internet or another external data communications network. For example, one user 14 may use the laptop 20a to browse to a webpage (e.g. a course page) that displays elements of the electronic learning system 30.

The electronic learning system 30 can include one or more components for providing electronic learning services. It will be understood that in some embodiments, each of the one or more components may be combined into fewer number of components or may be separated into further components. Furthermore, the one or more components in the electronic learning system 30 may be implemented in software or hardware, or a combination of software and hardware.

For example, the electronic learning system 30 can include one or more processing components, such as computing servers 32. Each computing server 32 can include one or more processor. The processors provided at the computing servers 32 can be referred to as "system processors" while processors provided at computing devices 20 can be referred to as "device processors". The computing servers 32 may be a computing device 20 (e.g. a laptop or personal computer).

It will be understood that although two computing servers 32 are shown in FIG. 1, one or more than two computing servers 32 may be provided. The computing servers 32 may be located locally together, or distributed over a wide geographic area and connected via the network 28.

The system processors may be configured to control the operation of the electronic learning system 30. The system processors can initiate and manage the operations of each of the other components in the electronic learning system 30. The system processor may also determine, based on received data, stored data and/or user preferences, how the electronic learning system 30 may generally operate.

The system processor may be any suitable processors, controllers or digital signal processors that can provide sufficient processing power depending on the configuration, purposes and requirements of the electronic learning system 30. In some embodiments, the system processor can include more than one processor with each processor being configured to perform different dedicated tasks.

In some embodiments, the computing servers 32 can transmit data (e.g. electronic files such as web pages) over the network 28 to the computing devices 20. The data may include electronic files, such as webpages with course information, associated with the electronic learning system 30. Once the data is received at the computing devices 20, the device processors can operate to display the received data.

The electronic learning system 30 may also include one or more data storage components 34 that are in electronic communication with the computing servers 32. The data storage components 34 can include RAM, ROM, one or more hard drives, one or more flash drives or some other suitable data storage elements such as disk drives, etc. The data storage components 34 may include one or more databases, such as a relational database (e.g., a SQL database), for example.

The data storage components 34 can store various data associated with the operation of the electronic learning system 30. For example, course data 35, such as data related to a course's framework, educational content, and/or records of assessments, may be stored at the data storage components 34. The data storage components 34 may also store user data, which includes information associated with the users 12, 14. The user data may include a user profile for each user 12, 14, for example. The user profile may include personal information (e.g., name, gender, age, birthdate, contact information, interests, hobbies, etc.), authentication information to the electronic learning system 30 (e.g., login identifier and password) and educational information (e.g., which courses that user is enrolled in, the user type, course content preferences, etc.).

The data storage components 34 can store authorization criteria that define the actions that may be taken by certain users 12, 14 with respect to the various educational contents provided by the electronic learning system 30. The authorization criteria can define different security levels for different user types. For example, there can be a security level for an instructing user who is responsible for developing an educational course, teaching it, and assessing work product from the student users for that course. The security level for those instructing users, therefore, can include, at least, full editing permissions to associated course content and access to various components for evaluating the students in the relevant courses.

In some embodiments, some of the authorization criteria may be pre-defined. For example, the authorization criteria can be defined by administrators so that the authorization criteria are consistent for the electronic learning system 30, as a whole. In some further embodiments, the electronic learning system 30 may allow certain users, such as instructors, to vary the pre-defined authorization criteria for certain course contents.

The electronic learning system 30 can also include one or more backup servers 31. The backup server can store a duplicate of some or all of the data 35 stored on the data storage components 34. The backup server 31 may be desirable for disaster recovery (e.g. to prevent data loss in the event of an event such as a fire, flooding, or theft). It should be understood that although only one backup server 31 is shown in FIG. 1, one or more backup servers 31 may be provided in the electronic learning system 30. The one or more backup servers 31 can also be provided at the same geographical location as the electronic learning system 30, or one or more different geographical locations.

The electronic learning system 30 can include other components for providing the electronic learning services. For example, the electronic learning system 30 can include a management component that allows users 12, 14 to add and/or drop courses and a communication component that enables communication between the users 12, 14 (e.g., a chat software, etc.). The communication component may also enable the electronic learning system 30 to benefit from tools provided by third-party vendors. Other example components will be described with reference to FIG. 2.

Figure 2:
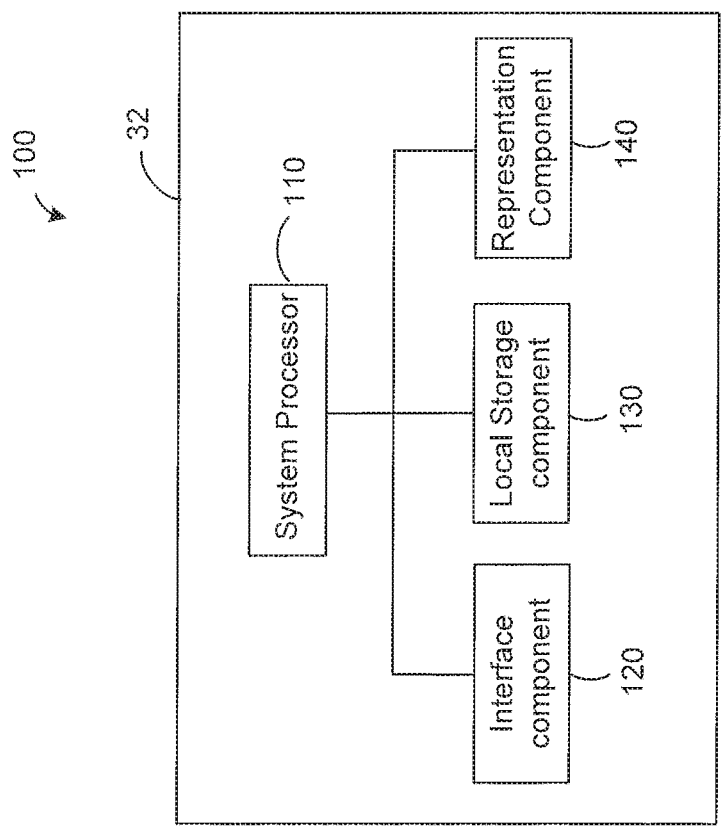
FIG. 2 is a block diagram of some components that may be implemented in the electronic learning system in accordance with an example embodiment.

Referring now to FIG. 2, which is a block diagram 100 of some components that may be implemented in the electronic learning system 30 according to some embodiments. In the example of FIG. 2, the various illustrated components are provided at one of the computing servers 32.

As shown in FIG. 2, the computing server 32 may include a system processor 110, an interface component 120, a local storage component 130 and a representation component 140. Each of the system processor 110, the interface component 120, the local storage component 130 and the representation component 140 can be in electronic communication with one another. It should be noted that in alternative embodiments, the system processor 110, the interface component 120, the local storage component 130 and the representation component 140 may be combined or may be separated into further components. Furthermore, the system processor 110, the interface component 120, the local storage component 130 and the representation component 140 may be implemented using software, hardware or a combination of both software and hardware.

Generally, the system processor 110 controls the operation of the computing server 32 and, as a result, various operations of the electronic learning system 30. For example, the system processor 110 may be configured to initiate the representation component 140 to generate a representation of the usage of the electronic learning system 30 in accordance with the methods described herein.

The interface component 120 may be any interface that enables the computing server 32 to communicate with the other computing servers 32, backup servers 31 and data storage components 34 within the electronic learning system 30. The interface component 120 may also include any interface that enables the computing server 32 to communicate with third-party systems. In some embodiments, the interface component 120 can include at least one of a serial port, a parallel port or a USB port. The interface component 120 may also include at least one of an Internet, Local Area Network (LAN), Ethernet, Firewire, modem or digital subscriber line connection. Various combinations of these elements may be incorporated within the interface component 120.

In some embodiments, the interface component 120 may receive input from the computing devices 20 via various input components, such as a mouse, a keyboard, a touch screen, a thumbwheel, a track-pad, a track-ball, a card-reader, voice recognition software and the like depending on the requirements and implementation of the electronic learning system 30.

The local storage component 130 may be provided at the computing server 32 for temporary storage of data associated with various operations of the system processor 110. The local storage component 130 may receive data from and/or transmit data to the data storage components 34.

The representation component 140 can include the software and data associated with the various methods for generating a representation of the usage of the electronic learning system 30 as described herein. The system processor 110 can initiate operation of the representation component 140 for representing the usage of the electronic learning system 30, for example. Example embodiments will now be described with reference to FIGS. 3 to 6C.

Figure 3:
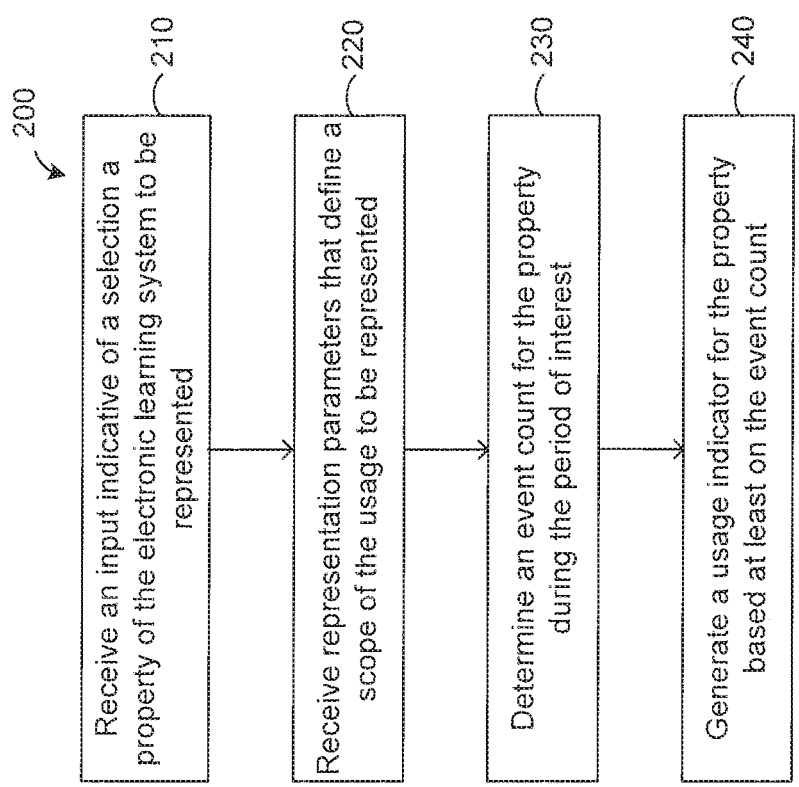
FIG. 3 is a flowchart diagram of an example method for representing usage of the electronic learning system.

Referring now to FIG. 3, a flowchart diagram illustrating an example method 200 for representing usage of the electronic learning system 30 is shown. To illustrate the method 200, reference will be made simultaneously to FIGS. 4A to 6C.

At 210, the system processor 110 receives an input indicative of a selection of a property of the electronic learning system 30 to be represented.

As noted, the property can include a course content that is provided by the electronic learning system 30 and an activity available for that course content. Example properties will now be described with reference to FIG. 4A.

Figure 4A:
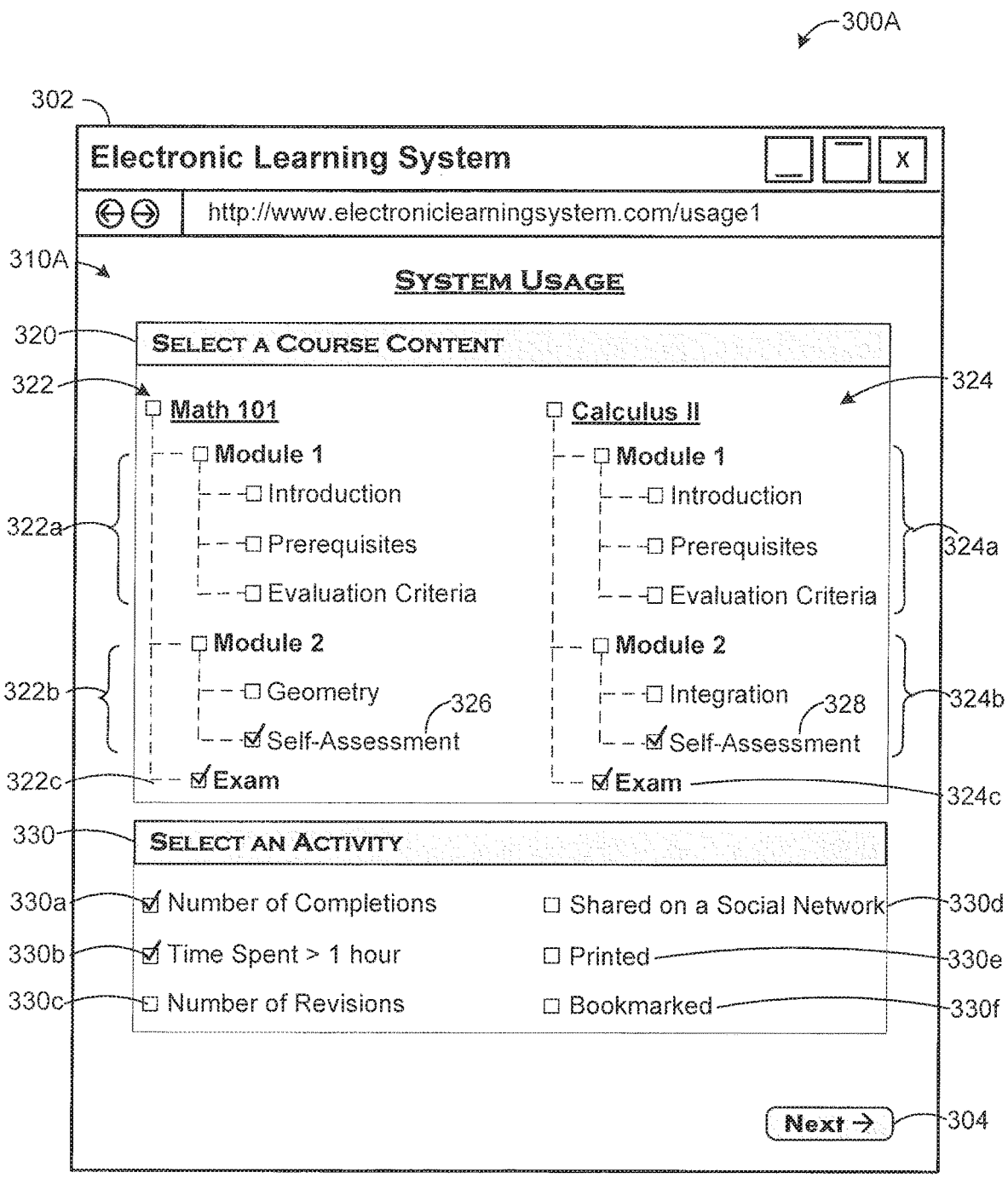
FIGS. 4A and 4B are screenshots of example user interfaces for receiving various inputs by the electronic learning system.

FIG. 4A illustrates a screenshot 300A of an example user interface 310A for receiving an input for selecting the property in accordance with an example embodiment. The user interface 310A is displayed in an example web browser 302. The user interface 310A includes a course content selection component 320 and an activity selection component 330. It will be understood that the selection components 320, 330 are only example interface components for receiving inputs from the users 12, 14 and that other types of interface components may be used for receiving data.

The course content can generally include various aspects of a course, such as a discussion forum, a learning objective page, a chat, a message board, a Wiki page, an assessment (e.g., a self-assessment, quiz, mid-term exam, etc.), a rubric, an assignment, a survey, a checklist, and a submission tool. As will be described with reference to FIG. 4A, the course contents can be organized into different modules, such as by a topic. It is possible that multiple of the same type of course contents is provided for a course and within one particular collection.

The various course contents may also be organized into various categories by the system processor 110, in some embodiments. The categories may be based on certain frequencies of interaction (e.g., the course content with the most viewed forum, the least commented chat, the review that received the greatest number of ratings or the content that was bookmarked the most) or a range of values (e.g., the user who earned the highest grade for an assessment, with the fewest number of replies to discussion forums or with a highest average rating on a comment). Other types of categories can include course contents that received some form of acknowledgement (e.g., viewed, received a rating, received a review, was shared onto a social media platform, was bookmarked, was printed, etc.), course contents associated with an activity that exceeded a predefined amount (e.g., course content on which one or more student spent more than a predefined period of time, course content that received more than a predefined number of feedbacks, etc.) and other relevant categories.

In the example of FIG. 4A, the relevant courses are "Math 101" and "Calculus II". For each course, a list of course content available for selection is shown, that is a course content list 322 is available for Math 101 and a course content list 324 is available for Calculus II.

In the course content list 322, the course contents available for Math 101 are organized into three collections, namely a "Module 1" collection (a first collection 322a), a "Module 2" collection (a second collection 322b) and an exam (a third collection 322c). First and second collections 322a and 322b include other course contents. The first collection 322a includes an introduction content providing an overview of Math 101, a prerequisites content indicating the requirements for enrolling into Math 101 and an evaluation criteria content providing the rubric for Math 101. The second collection 324b includes a course content on the topic of geometry and a self-assessment content (course content 326).

Similarly, the course contents available for Calculus II are organized into three collections, namely a "Module 1" collection (a first collection 324a), a "Module 2" collection (a second collection 324b) and an exam (a third collection 324c). First and second collections 324a and 324b include other course contents. The first collection 324a includes the same type of course contents as the first collection 322a but the course contents are specific to Calculus II. The second collection 324b includes a course content on the topic of integration and a self-assessment content (course content 328).

In the illustrated example of FIG. 4A, the same type of course contents, namely the self-assessment contents 326, 328 in the respective second collections 322b and 324b, and the exams 322c and 324c are selected by the user 12, 14 to be represented. It will be understood that the same type of course contents is shown as selected in FIG. 4A for ease of exposition and that different types of course contents may be selected instead.

Continuing with reference to FIG. 4A, various different activities are shown in the activity selection component 330.

Generally, the activities available for the course contents can be categorized based on the type of the interaction. Example categories for the activities can include user interactions, social interactions, system contributions and user characteristics.

The user interactions can include actions conducted by a student with respect to the electronic learning system 30. For example, the user interactions can include an amount of time spent viewing a course content, an amount of time spent responding to a course content, a number of revisions made to a course content, a number of keystrokes involved with a course content, a rating provided for a course content, a review for a course content and aspects of that review (e.g., a quality, a length of the review and an amount of time spent writing that review), and a comment provided for a course content (e.g., a quality, a length of the comment and an amount of time spent writing that comment), a number of completions of the course content, a number of contributions to a course content, whether the course content was created by that student, whether a course content was bookmarked and whether a course content was printed.

The social interactions can include electronic interactions between students and interactions on social media platforms by a student or by another social media contributor associated with the student. The social media platforms may include Twitter™, Facebook™, Google+™ and other similar social media tools.

Example social media interactions can include generating a social media message that is associated with a course content, a reply to that social media message by another social media contributor, sharing of that social media message by another social media contributor, receiving a feedback to that social media message from another social media contributor, and providing a feedback to the social media message or a received feedback.

Example electronic interactions between students can include receiving or providing a peer review to a student-generated course content, receiving a response to a question posted on a course content (e.g., discussion forum), any actions associated with the response (e.g., the response is "flagged" or "tagged"), being referenced by another student and having a contribution referenced by another student.

The system contributions can include a grade achieved, whether an activity was assessed, whether a goal was achieved, whether a curriculum target was met, and whether a learning objective was met.

The user characteristics include different aspects associated with the users 12, 14 such as a number of courses a student is enrolled in, a semester level achieved, the enrolled program (e.g., the Faculty and program of study, etc.), a student's current grade, a student's overall grade (e.g., the student's grade point average across multiple courses, etc.) and any associated educational groups 16 or sub-groups 18 (e.g., course-based, project-based, user characteristics, user-defined, instructor defined, etc.). Other user characteristics can include a location of the user, such as a geographic location (e.g., country, city, etc.), Global Positioning System (GPS) coordinates, an altitude level or a relative position from a landmark (e.g., a University building). For example, the property can include an indication of a specific educational group 16 for which the usage of the electronic learning system 30 is considered.

Referring still to FIG. 4A, as shown in the activity selection component 330, various different activities may be selected for each course content in the course content lists 322 and 324. The example activities in FIG. 4A include a number of completions for the course content (activity 330*a*), time spent being over an hour (activity 330*b*), number of revisions (activity 330*c*), whether the course content was shared on a social network (activity 330*d*), whether the course content was printed (activity 330*e*) or bookmarked (activity 330*f*). The activities listed in the activity selection component 330 are merely examples and it will be understood that fewer or a greater number of activities may be represented by the electronic learning system 30.

In the example embodiment of FIG. 4A, the activities selected are the activities 330*a* and 330*b*. Accordingly, the input received by the system processor 110 in this example indicates that the property to be represented includes the number of completions and number of time spent on the course content being over one hour for each of the self-assessments 326 and 328 and the exams 322*c* and 324*c*.

The user interface 310A shown in FIG. 4A further includes a pushbutton 304 for receiving an input from the user 12, 14 for proceeding to the next step in the described method for representing the usage based on the selected property. For this example, the system processor 110 proceeds to display the user interface 310B shown in FIG. 4B in response to receiving an input selecting the pushbutton 304. It will be understood that the illustrated pushbutton 304 is merely an example and that other user interface icons may similarly be used. Alternatively, the user interface 310A may be configured to include all the interface components shown in both user interfaces 310A and 310B.

At 220, the system processor 110 receives representation parameters that define a scope of the usage to be represented.

The representation parameters can vary the scope of the usage to be represented.

Figure 4B:
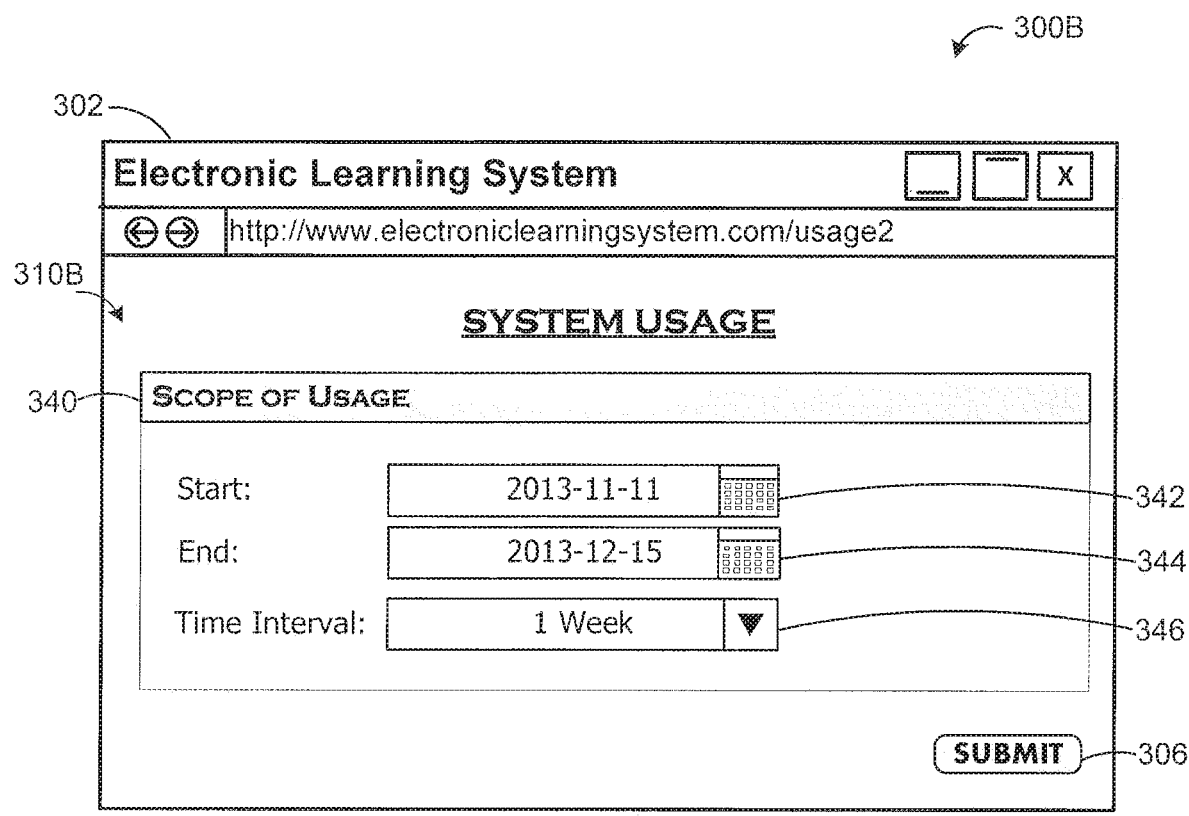
Figure 5D:
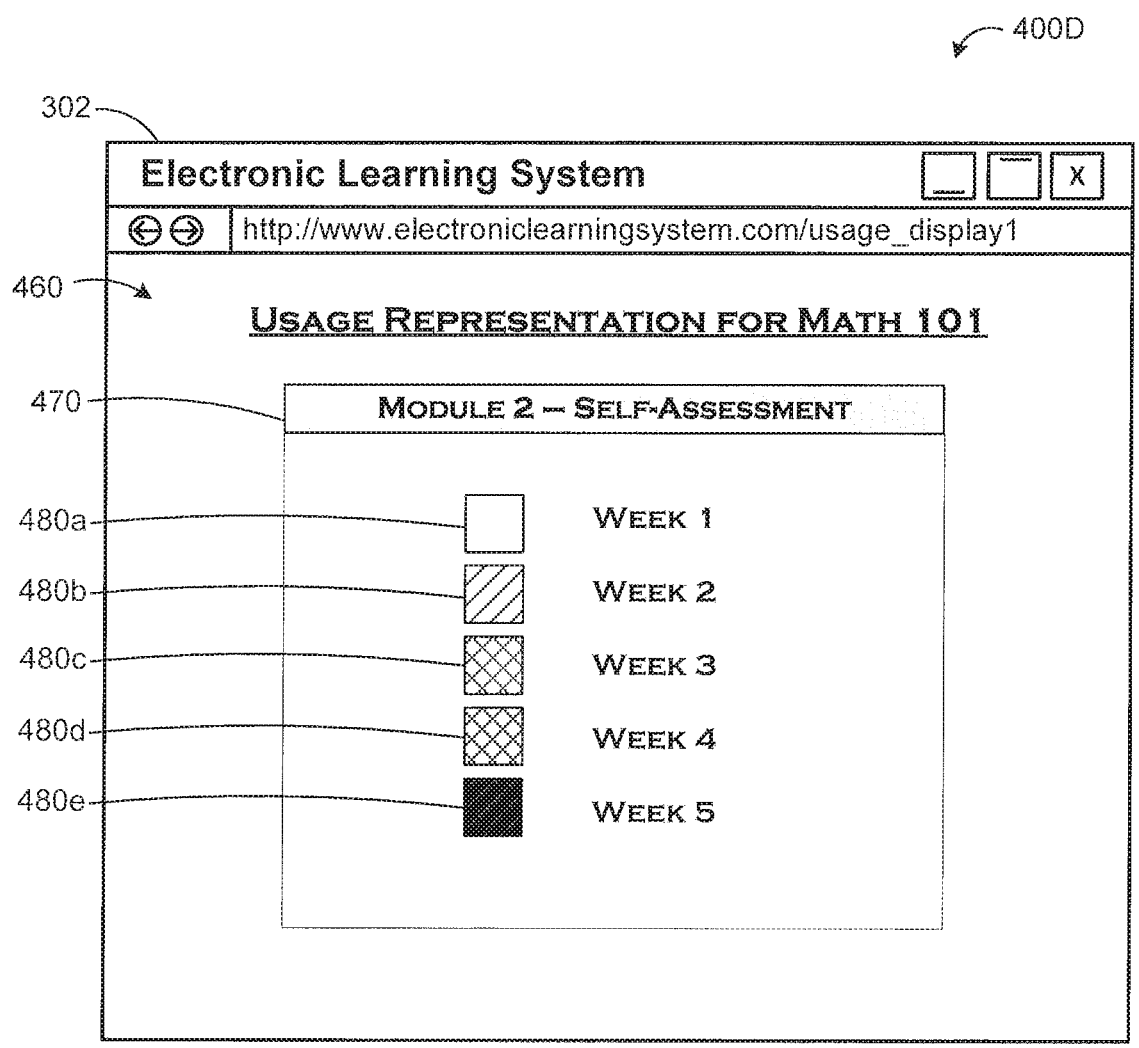
FIG. 5D is a screenshot of an example graphical representation of the usage indicator values in FIG. 5C.

FIG. 4B illustrates a screenshot 3008B of an example user interface 310B for receiving the representation parameters in accordance with an example embodiment. In the example shown in FIG. 4B, the scope is only limited based on time. It will be understood that different or additional types of scope variations may similarly be applied.

The user interface 310B includes a usage scope component 340 for receiving the representation parameters from the user 12, 14. The usage scope component 340 includes a start date component 342 for receiving a start date for the period of interest and an end date component 344 for receiving an end date for the period of interest. The period of interest is defined by the start date and the end date. In this example, the period of interest begins on Nov. 11, 2013 and ends on Dec. 15, 2013. Once the period of interest is received by the system processor 110, the system processor 110 can identify the relevant data for the property during that time.

Also provided in the usage scope component 340 is a time interval component 346. In some embodiments, the system processor 110 can further organize the data into segments based on the time interval received via the time interval component 346. The time interval is shorter than the received period of interest and may be any time periods, such as a certain period of time (e.g., 10 minutes), days (e.g., a week, a day, etc.), months and other similar time periods. By segmenting the data, the user 12, 14 can more clearly identify the periods of interest for review and analysis. For example, a time interval that is 10 minutes long can be useful for understanding usage of the electronic learning system 30 right before a significant course assessment, such as a quiz, whereas a time interval that is 1 year can be useful for understanding semester-wide trends.

In some embodiments, the time interval can be a specific portion within the period of interest, as selected by the user 12, 14.

It will be understood that the start date component 342, the end date component 344 and the time interval component 346 shown in FIG. 4B are merely examples and that other user interface components, such as a slider bar, may similarly be used.

In some embodiments, the scope of the usage representation can vary by educational groups 16. As noted, the educational groups 16 may be defined based on different aspects of the electronic learning system 30, such as user properties and course enrollment. By targeting certain educational groups 16, the usage representation can be generated so that the user 12, 14 can develop a better understanding of the correlation between the course contents and the results of the assessments. For example, the educational groups 16 can be defined by the instructor to include students with a similar current course grade average, a similar overall grade point average, students enrolled in a particular faculty and/or program of study, or students with a similar score in a particular assessment. For each of these educational groups 16, the instructor can determine how those students used the course contents and whether the course contents affect the results achieved by those students.

The user interface 310B shown in FIG. 4B further includes a pushbutton 306 for receiving an input from the user 12, 14. For this example, the system processor 110 proceeds to generate a representation (such as that shown in FIG. 5D or FIG. 6C, for example) of the usage of the electronic learning system 30 based on the inputs received via the user interfaces 310A and 310B. Similar to the pushbutton 304, it will be understood that the illustrated pushbutton 306 is merely an example and that other user interface icons may similarly be used.

At 230, the system processor 110 determines an event count for the property during the period of interest.

Generally, the event count can include the number of events associated with the property selected at 210 for the period of interest identified at 220. The event count can be determined from the number of relevant events that are stored at the data storage components 34. The event count may be determined by the system processor 110 or provided to the system processor 110 by the data storage components 34. In some embodiments, the relevant events can first be retrieved from the data storage components 34 and stored at the local storage component 130 for facilitating the determination of the event count by the system processor 110.

The system processor 110 may, in some embodiments, determine the event count by first clearing the event count stored at the data storage components 34 or the local storage component 130. For example, the system processor 110 can set the event count to zero. The system processor 110 can then retrieve, from the data storage components 34 or the local storage component 130, events that satisfy the representation parameters identified in FIG. 4B. For each retrieved event, the system processor 110 then determines whether that retrieved event is associated with the property identified in FIG. 4A. In the case that the retrieved event is associated with the property, the system processor 110 proceeds to increment the event count.

Other example methods of determining the event counts will be described with reference to FIGS. 5A to 5C. For ease of exposition, only the event count for the self-assessment content 326 for Math 101 is shown in FIGS. 5A to 5C. Methods for determining the event counts for two different courses will be described with reference to FIGS. 6A to 6C.

FIG. 5A is a table 400A illustrating the event counts for the property selected at 210 in respect of the self-assessment content 326 during the identified period of interest, in accordance with an example embodiment.

As shown in FIG. 5A, the period of interest is separated into a set of sub-periods based on the time interval selected in FIG. 4B. Each column in table 400A corresponds to a sub-period within the period of interest, namely Nov. 11, 2013 to Dec. 15, 2013. In the case of a semester course, for example, the identified period of interest generally corresponds to a time period closer to the date of final exams. The usage of the self-assessment 326 provided by the electronic learning system 30 for Math 101 can help the instructor of Math 101 determine how and when the self-assessment 326 is used during that time period.

For embodiments in which the period of interest is not separable into sub-periods that each corresponds to the time interval, the period of interest is separated into at least one sub-period that corresponds to the time interval.

For each sub-period, the system processor 110 can determine a count for each activity identified in FIG. 4A (e.g., activities 330a and 330b) for the self-assessment content 326 during that sub-period. The event count will be a sum of the counts from each sub-period. As shown in FIG. 5A, the activity 330a is associated with the counts 410a to 410e and the activity 330b is associated with the counts 420a to 420e.

From FIG. 5A, it can be seen, from the counts 410a to 410e, that the number of completions increases substantially as the final exams approaches and, from the counts 420a to 420e, it can be seen that the time spent on the self-assessment 326 fluctuates.

The counts 410a to 410e and 420a to 420e shown in FIG. 5A are raw data values that directly correspond to the number of relevant events stored at the data storage components 34. The counts 410a to 410e and 420a to 420e may be further processed by the system processor 110 in order to demonstrate the correlation between the various data sets and to generate the usage indicator.

To prevent irregular skews in the counts 410a to 410e and 420a to 420e, the system processor 110 may adjust the counts 410a to 410e and 420a to 420e base on a count parameter. The count parameter may include one or more limitations for the counts 410a to 410e and 420a to 420e. For instance, the system processor 110 can operate to limit the counts 410a to 410e and 420a to 420e by an upper count limit, a lower count limit or both.

The count parameter can help the system processor 110 analyze the data and to smooth the data. For example, with the count parameter, the system processor 110 can analyze the counts 410a to 410e and 420a to 420e to remove any irregular counts in order to more clearly illustrate trends in the usage of the electronic learning system 30. In this way, the resulting usage representation would not be skewed by irregular activities. For example, an instructor may be interested in identifying the most popular topics within the course and define topics to be "popular" if there are at least ten interactions with the course contents associated with that topic. In this way, the system processor 110 can eliminate any topic with fewer than ten interactions in order to provide the user 12, 14 with the data of interest.

To restrict the counts 410a to 410e and 420a to 420e by the upper count limit, the system processor 110 can, in some embodiments, receive an upper count limit as part of the count parameter and operate to adjust each count by determining whether the counts 410a to 410e and 420a to 420e exceeds the upper count limit.

The system processor 110 can reduce the count to the upper count limit if that count exceeds the upper count limit. With respect to the counts 410a to 410e and 420a to 420e shown in FIG. 5A, if the upper count limit is '20', the system processor 110 will operate to reduce the count 410e to '20'. No other counts in FIG. 5A require adjustment. It will be understood that other upper count limits can similarly be applied depending on the requirements of the usage representation to be generated by the system processor 110.

In some embodiments, the system processor 110 can receive the lower count limit as part of the count parameter and operate to adjust each count based on the lower count limit. For each count, the system processor 110 can generate an intermediary count by subtracting the lower count limit from the count. If the resulting intermediary count is less than zero, the system processor 110 can then set that count to zero but otherwise, the system processor 110 can use the intermediary event count as the event count.

Referring again to the counts 410a to 410e and 420a to 420e shown in FIG. 5A, if the lower count limit is '5', the system processor 110 will operate to vary the counts 410a to 410e and 420a to 420e accordingly. For the activity 330a, the count 410a will remain at '0' since the intermediary count for Week 1 is less than zero; the count 410b will also be '0' since the intermediary count for Week 2 is less than zero; the count 410c will be '10', which is the intermediary count for Week 3; the count 410d will be '15', which is the intermediary count for Week 4; and the count 410e will be '25', which is the intermediary count for Week 5.

Similarly, for the activity 330b, the count 420a will remain at '0' since the intermediary count for Week 1 is less than zero; the count 420b will also be '0' since the intermediary count for Week 2 is less than zero; the count 420c will be '0', which is the intermediary count for Week 3; the count 420d will be '3', which is the intermediary count for Week 4; and the count 420e will be '0', which is the intermediary count for Week 5.

It will be understood that other lower count limits can similarly be applied depending on the requirements of the usage representation to be generated by the system processor 110.

In some examples, the system processor 110 can apply various adjustments to the counts, either the raw data values or corresponding values that have been limited based on the count parameter, in order to normalize the values. Normalizing the counts 410a to 410e and 420a to 420e is used to generate unit-less values between 0.0 and 1.0 so that the resulting values can be graphically represented accordingly.

Referring now to FIG. 5B, which is a table 400B illustrating adjusted event counts 410a' to 410e' and 420a' to 420e' for each of the counts 410a to 410e and 420a to 420e shown in FIG. 5A in accordance with an example embodiment.

In some embodiments, the system processor 110 can adjust the counts for each activity based on the count with the greatest value. For example, the system processor 110 can identify the top count from the counts 410a to 410e for the activity 330a in FIG. 5A, namely the count 410e. The system processor 110 can then normalize each of the counts 410a to 410e for the activity 330a using the count 410e. The adjusted event counts 410a' to 410e' shown in FIG. 5B for the activity 330a correspond to normalized counts.

For the activity 330b, the system processor 110 can also identify the top count, namely the count 420d. The system processor 110 can then normalize each of the counts 420a to 420e for the activity 330b using the count 420d. The adjusted event counts 420a' to 420e' shown in FIG. 5B for the activity 330b correspond to normalized counts.

As shown in FIG. 5B, the adjusted event counts 410a' to 410e' and 420a' to 420e' generated by normalizing the counts 410a to 410e and 420a to 420e fall within a range of 0.0 to 1.0.

In some further embodiments, the system processor 110 may apply further adjustments to the counts 410a to 410e and 420a to 420e shown in FIG. 5A or to the adjusted event counts 410a' to 410e' and 420a' to 420e' shown in FIG. 5B in accordance with a transformation mode indicator. By further transforming the adjusted event counts 410a' to 410e' and 420a' to 420e', the resulting values can be aggregated with different methods. The transformation of the counts can facilitate further smoothing of the data and illustration of different trends in the data.

The system processor 110 may receive an indication of a particular transformation mode indicator via one of the user interfaces 310A or 310B, for example. The transformation mode indicator generally provides a type of adjustment to be applied to the counts 410a to 410e and 420a to 420e. The various transformation modes can include a standard mode, a cumulative average mode and a peak mode. Other transformation modes may similarly be applied.

When operating in the standard mode, the system processor 110 does not vary the counts 410a to 410e and 420a to 420e for each of the sub-periods. Instead, the counts 410a to 410e and 420a to 420e continue to correspond to the aggregated values during that time period. The current mode may be the default mode for some embodiments.

When operating in the peak mode, the system processor 110 operates to identify the sub-period associated with the top count for a particular activity. The top count is the count with the highest value. The peak mode can be particularly useful for illustrating trends in the various activities. After identifying that sub-period, the system processor 110 then replaces the counts in the subsequent sub-periods with that top count. For example, for the self-assessment 326 in Math 101, the top count for the activity 330b is the adjusted event count 420d'. The system processor 110 will therefore replace the adjusted event count 420e' with the adjusted event count 420d'.

In some embodiments, a count may need to meet additional requirements (other than having the highest value for a particular activity) before being considered the top count. For example, a count can be identified by the system processor 110 as the top count when it has the highest value for a particular activity and the subsequent counts do not vary from that highest value for more than a certain portion of that highest value for a certain period of time. That is, with respect to the example shown in FIG. 5B, although the adjusted event count 420d' is the highest value for the activity 330b, the adjusted event count 420d' may only qualify as the top count if the subsequent counts (e.g., adjusted event count 420d') do not vary from the adjusted event count 420d' by more than 10% of the value of the adjusted event count 420d'. That is, the adjusted event count 420e' needs to be at least 0.9 in order for the adjusted event count 420d' to qualify as the top count. Since the adjusted event count 420e' is less than 0.9 in the example shown in FIG. 5B, the adjusted event count 420d' would not qualify as the top count in this case. Different percentages of the highest value and different subsequent time periods may similarly be used for identifying the top count.

When operating in the cumulative average mode, the system processor 110 replaces the count for each sub-period with an average of the counts for the preceding sub-periods. The cumulative average mode can also be useful for illustrating trends in the various activities. For each sub-period, the system processor 110 retrieves the counts from the preceding sub-periods. The system processor 110 can then generate an adjusted event count by determining an average of the counts from that sub-period and the preceding sub-periods. The system processor 110 replaces the count for that sub-period with the adjusted event count.

For example, referring again to FIG. 5B, when the transformation mode is the cumulative average mode, the system processor 110 operates to transform the adjusted event counts 410a' to 410e' and 420a' to 420e' accordingly. For the activity 330a, the adjusted event count 410a' is unchanged since there is no preceding sub-period; the adjusted event count 410b' becomes '0.05', which is the average of the adjusted event counts 410a' and 410b'; the adjusted event count 410c' becomes '0.2', which is the average of the adjusted event counts 410a' to 410c'; the adjusted event count 410d' becomes '0.3175', which is the average of the adjusted event counts 410a' to 410d'; and the adjusted event count 410e' becomes '0.454', which is the average of the adjusted event counts 410a' to 410e'.

For the activity 330b, the adjusted event count 420a' is unchanged since there is no preceding sub-period; the adjusted event count 420b' becomes '0.065', which is the average of the adjusted event counts 420a' and 420b'; the adjusted event count 420c' becomes approximately '0.253', which is the average of the adjusted event counts 420a' to 420c'; the adjusted event count 420d' becomes '0.44', which is the average of the adjusted event counts 420a' to 420d'; and the adjusted event count 420e' becomes '0.478', which is the average of the adjusted event counts 420a' to 420e'.

At 240, the system processor 110 generates a usage indicator 450 for the property based at least on the event count.

The usage indicator 450 is generally reflective of a usage amount of the property during the period of interest. The usage indicator 450 can be determined from the normalized counts associated with the activities of interest and in some embodiments, with the application of weight factors associated with those activities. The weight factors can be any numerical value between 0.0 to 1.0. The weight factors to be used may or may not sum to one since it is possible that only some of the activities available for a course content is selected for representation.

In embodiments where the weight factors to be used do not sum to one, those weight factors can be proportionally adjusted to sum to one. For instance, if the weight factors 0.4 and 0.1 are to be used, those weight factors can be proportionally adjusted to 0.8 and 0.2, respectively.

In some embodiments, the system processor 110 may associate different weight factors to the different activities of the course content. The weight factors can generally indicate an amount of influence that a particular activity has on the usage of the electronic learning system 30. The use of the weight factors allows for the different activities to be weighted differently with respect to each other. For example, the instructor of a course may consider one activity, such as completing a self-assessment, to be more important than another activity, such as printing the self-assessment. The weight factors may be automatically generated by the electronic learning system 30 or defined by the user 12 (e.g., an instructor).

FIG. 5C is a table 400C illustrating usage indicators 450a to 450e generated based on the respective adjusted event counts 410a' to 410e' and 420a' to 420e' of FIG. 5B. In this example, a weight factor of 0.8 is associated with the activity 330a and a weight factor of 0.2 is associated with the activity 330b. The user 12 in this example, therefore, considers the activity 330a (e.g., the number of times the self-assessment 326 was completed) to be more influential than the activity 330b (e.g., the number of times in which more than one hour was spent on the self-assessment 326).

In some other embodiments, the system processor 110 may not associate any weight factors to the activities for a course content. For example, the instructor may consider the activities to have equal influence on the usage of the electronic learning system 30. The usage indicator 450 may be determined by applying the same weight factor to each of the adjusted event counts. The weight factor can correspond to an inverse of the total number of activities being considered for the usage indicator 450. That is, referring again to FIG. 5C, instead of applying the weight factors, 0.8 and 0.2, to the respective activities 330a and 330b, the weight factor 0.5 (i.e., the inverse of two) is applied to both activities 330a and 330b. This may be the default setting in some embodiments.

After determining the usage indicator 450, the system processor 110 may provide a visual representation of the usage indicator 450 to assist the user 12 in understanding the usage of the electronic learning system 30. For example, the visual representation can help an instructor determine how their course content is being used over the duration of a course, track the progress of certain educational groups 16 during a course, and/or identify course contents that are not accessed often enough to warrant the purchase cost of that course content.

In some embodiments, the visual representation may include a heat map or a line graph. It will be understood that other types of visual representations that can help distinguish between the different usage indicators 450a to 450e can similarly be used.

The visual representation may include, in some embodiments, an adjustable representation for which the scope of the usage to be displayed can be modified, possibly in or close to real-time, by inputs received from the user 12. In some embodiments, the adjustable representation can include receiving an input from the user 12, 14 requesting for the relevant usage indicators 450 to be sequentially illustrated, as if the adjustable representation is a video display.

For example, the adjustable representation can be varied based on input values provided from the user. The input values can include various control inputs, such as "play" to show the relevant usage indicators 450 sequentially, "rewind" to move the display of the usage indicators 450 back in time, "forward" to move the display of the usage indicators 450 forward in time, "stop" or "pause" to hold the display of the usage indicators 450 at a particular point in time and other similar controls. The adjustable representation can receive other inputs to specify a particular point in time in which the usage indicators 450 are to be displayed.

Referring now to FIG. 5OD, which is a screenshot 400D of a graphical representation 470 of the usage of the electronic learning system 30 in accordance with an example embodiment. The graphical representation 470 is a modified heat map generated based on usage indicators 450a to 450e of FIG. 5C and shown in an example user interface 460. As is known in the art, heat maps are generally graphical representations of data in which the data values are represented by colours. For the purpose of maintaining clarity, the usage indicators 450a to 450e are shown in the modified heat map 470 with different degrees of cross-hatchings and shading. As illustrated by representations 480a to 480e, the degree of the cross-hatching and shading in the representations 480a to 480e generally corresponds to the value of the respective usage indicators 450a to 450e. In this example, the heat map 470 generally illustrates how the self-assessment 326 is used over the period of interest. However, the heat map 470 does not illustrate how the self-assessment 326 compares with respect to other course contents. Example usage indicators correlating the usage of different course contents will be described with reference to FIGS. 6A to 6C.

FIG. 6A illustrates tables 500A and 502A for event counts of two course contents provided by the electronic learning system 30 in accordance with an example embodiment. In the example of FIG. 6A, the course contents are in respect of two different courses, a first course content 326 (i.e., self-assessment for Math 101) and a second course content 328 (i.e., self-assessment for Calculus II).

Table 500A includes the event counts 410a to 410e for the activity 330a in respect of the first course content 326. As described with respect to FIG. 5A, the event counts 410a to 410e correspond to the usage amount of the activity 330a for the first course content 326 during the respective sub-periods.

Table 502A includes the event counts 510a to 510e for the activity 330a in respect of the second course content 328. The event counts 510a to 510e correspond to the usage amount of the activity 330a for the second course content 328 during the respective sub-periods.

By representing the values provided in tables 500A and 502A, the user 12 can better appreciate how those properties vary over the period of interest and with respect to each other. That is, in the example shown in FIG. 6A, the user 12 can compare the value of the self-assessments 326 and 328 for the different courses. Depending on the course type, different course contents may be required. For example, courses that are directed to junior students may require course contents that help them to study (e.g., self-assessments, quizzes, etc.), whereas courses that are directed to senior students may instead require course contents that facilitate discussion and interaction with their peers (e.g., discussion forums, chats, etc.).

Continuing with the example shown in FIG. 6A, FIG. 6B illustrates tables 500B and 502B which include adjusted event counts corresponding to the event counts shown in FIG. 6A in accordance with an example embodiment.

As described with reference to FIG. 5B, the event counts 410a to 410e and 510a to 510e can generally be normalized with the methods described herein. The system processor 110 can, in some embodiments, adjust the event counts 410a to 410*e* and 510*a* to 510*e* using the same value so that the two sets of event counts are consistently normalized.

For instance, the system processor 110 can identify, from the event counts 410*a* to 410*e* and 510*a* to 510*e*, a top count that is associated with the highest value. The system processor 110 can then normalize the event counts 410*a* to 410*e* and 510*a* to 510*e* with the top count.

In an example embodiment in which the first course content 326 is associated with only one event count, namely a first event count, and the second course content 328 is associated with only one event count, namely a second event count, the system processor 110 can identify the top count by comparing the first event count with the second event count. The top count is the greater of the first event count and the second event count.

Continuing with the example of FIG. 6A, the system processor 110 can normalize the event counts 410*a* to 410*e* and 510*a* to 510*e* by identifying the event count with the greatest value, which is the event count 410*e*. The adjusted event counts 410*a*' to 410*e*' and 510*a*' to 510*e*' in FIG. 6B correspond to the event counts 410*a* to 410*e* and 510*a* to 510*e*, respectively, after being normalized with the event count 410*e*.

Further adjustments described herein may be applied to the values shown in FIGS. 6A and 6B depending on the user preferences and other relevant requirements.

The system processor 110 can determine usage indicators 450 for each of the adjusted event counts 410*a*' to 410*e*' and 510*a*' to 510*e*' provided in FIG. 6B. For the illustrated example, since only one activity is being considered, the adjusted event counts 410*a*' to 410*e*' and 510*a*' to 510*e*' can be the usage indicators 450.

Figure 6C:
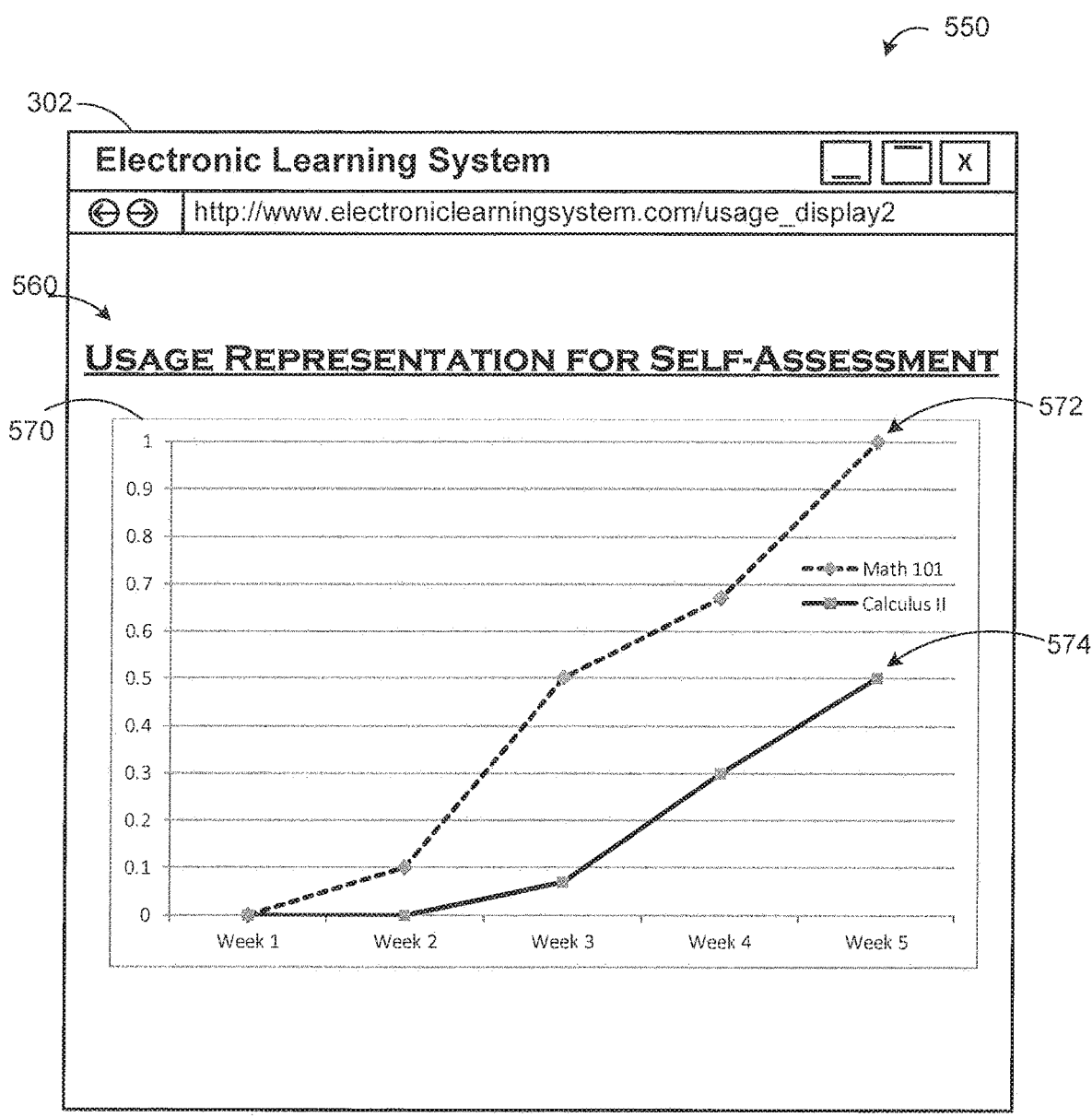
FIG. 6C is a screenshot of a graphical representation generated based on the adjusted event counts in FIG. 6B in accordance with an example embodiment.

Referring now to FIG. 6C, which is a screenshot 550 of a graphical representation 570 of the usage of the electronic learning system 30 in accordance with an example embodiment. The graphical representation 570 is shown in an example user interface 560.

The graphical representation 570 in this example is a line graph and includes a first graph 572 for the first course content 326 and a second graph 574 for the second course content 328. Each of the first graph 572 and the second graph 574 includes the values associated with the respective usage indicators 450 in FIG. 6B. It can be seen from the first graph 572 that the first course content 326 is more heavily used than the second course content 328, with the difference being increasingly evident as time progresses. Based on this, the instructor(s) for Math 101 and Calculus II can determine that the self-assessment content 326 is more valuable for more junior students since Math 101 is a more junior class than Calculus II and the instructor may therefore generate more similar course contents for Math 101.

The embodiments herein been described here by way of example only. Various modification and variations may be made to these example embodiments. Also, in the various user interfaces illustrated in the figures, it will be understood that the illustrated user interface text and controls are provided as examples only and are not meant to be limiting. Other suitable user interface elements may be possible.

We claim:

1. An electronic learning system comprising:
   a processing component configured to operate one or more components of the electronic learning system to represent usage of the electronic learning system;
   one or more storage components for storing, at least, events associated with the electronic learning system, the one or more storage components being in communication with the processing component; and
   a representation component operated by the processing component to:
   receive an input indicative of a selection of a property of the electronic learning system to be represented, the property including a course content provided by the electronic learning system and an activity available for that course content,
   receive representation parameters that define a scope of the usage to be represented, the representation parameters including at least a period of interest,
   determine an event count for the property during the period of interest, the event count corresponding to a number of events stored at the one or more storage components of the electronic learning system in association with the property for the period of interest,
   generate a usage indicator for the property based at least on the event count, the usage indicator being reflective of at least a usage amount of the property during the period of interest,
   determine one or more groups of users based at least in part on a respective level of achievement of the user with respect to a course associated with the course content,
   determine a correlation between the property and a level of achievement with respect to the course based at least in part on the one or more groups of users, and
   provide an indication of the correlation between the property and the level of achievement with respect to the course.

2. The electronic learning system of claim 1, wherein:
   the representation parameters comprise a time interval, the time interval being shorter than the period of interest; and
   the representation component is further operated by the processing component to:
   separate the period of interest into a set of sub-periods according to the time interval, a length of at least one sub-period corresponds to the time interval; and
   determine a plurality of counts for the period of interest, each count being the number of events corresponding to the property for a sub-period and the event count being a sum of the plurality of counts.

3. The electronic learning system of claim 2, wherein the representation component is further operated by the processing component to:
   determine a top count from the two or more counts, the top count being the count from the two or more counts with a greatest value; and
   normalize each count with the top count.

4. The electronic learning system of claim 3, wherein the representation component is further operated by the processing component to:
   receive a transformation mode indicator for the event count, the transformation mode indicator providing a type of adjustment to be applied to the event count; and
   vary each count in accordance with the transformation mode indicator.

5. The electronic learning system of claim 4, wherein:
   the transformation mode indicator corresponds to a peak mode; and
   the representation component is further operated by the processing component to:
   identify the sub-period associated with the top count; and for each sub-period subsequent to the identified sub-period, replace the corresponding normalized count with the normalized top count.

6. The electronic learning system of claim 4, wherein:
the transformation mode indicator corresponds to a cumulative average mode; and
for each sub-period, the representation component is further operated by the processing component to:
retrieve the count associated with each prior sub-period; and
generate an adjusted count by determining an average of the count for each prior sub-period and the count for that sub-period; and
replace the count for that sub-period with the adjusted count.

7. The electronic learning system of claim 1, wherein the representation component is further operated by the processing component to:
set the event count to zero;
retrieve, from the one or more storage components, events that satisfy the representation parameters; and
for each retrieved event, determine whether that event is associated with the property and if so, increment the event count.

8. The electronic learning system of claim 1, wherein the representation component is further operated by the processing component to:
receive a weight factor for the activity, the weight factor indicating an amount of influence the activity has on the usage of the electronic learning system; and
adjust the event count with the weight factor.

9. The electronic learning system of claim 1, wherein the representation component is further operated by the processing component to:
receive a count parameter for the event count, the count parameter providing at least one limitation to a value of the event count; and
adjust the event count based on the count parameter.

10. The electronic learning system of claim 9, wherein:
the count parameter comprises an upper count limit;
the representation component is further operated by the processing component to:
determine whether the event count exceeds the upper count limit; and
in response to determining the event count exceeds the upper count limit, reduce the event count to the upper count limit.

11. The electronic learning system of claim 9, wherein:
the count parameter comprises a lower count limit;
the representation component is further operated by the processing component to:
generate an intermediary event count by subtracting the lower count limit from the event count; and
if the intermediary event count is less than zero, set the event count to zero, otherwise use the intermediary event count as the event count.

12. The electronic learning system of claim 1, wherein:
the activity is associated with a first course content and a second course content that is different from the first course content;
the usage indicator comprises a first usage indicator for the activity at the first course content and a second usage indicator for the activity at the second course content;
the representation component is further operated by the processing component to:
generate a first event count for the first course content, the first event count corresponding to the usage amount of the activity at the first course content during the period of interest; and
generate a second event count for the second course content, the second event count corresponding to the usage amount of the activity at the second course content during the period of interest; and
generate each of the first usage indicator and the second usage indicator based at least on the first event count and the second event count.

13. The electronic learning system of claim 12, wherein the representation component is further operated by the processing component to:
determine whether the first event count is greater than the second event count; and
if the first event count is greater than the second event count, normalize each of the first event count and the second event count with the first event count, otherwise normalize each of the first event count and the second event count with the second event count.

14. The electronic learning system of claim 1, wherein the representation component is further operated by the processing component to provide a visual representation of the usage indicator.

15. The electronic learning system of claim 14, wherein the visual representation comprises a heat map.

16. The electronic learning system of claim 14, wherein the visual representation comprises an adjustable display operable to:
receive one or more control inputs for selecting a designated time within the period of interest; and
varying the visual presentation to illustrate the usage indicator at the designated time.

17. The electronic learning system of claim 1, wherein the property further comprises a group composed of one or more users of the electronic learning system.

18. The electronic learning system of claim 1, wherein the activity comprises at least an interaction by a user with the electronic learning system.

19. The electronic learning system of claim 1, wherein the course content comprises any one or more components that provides course material, a discussion forum, a chat, an assessment, a rubric, an assignment, a message board, a checklist, and a submission tool.

* * * * *